United States Patent Office.

JOB GIFFORD, OF SMITHPORT, PENNSYLVANIA.

*Letters Patent No. 62,403, dated February 26, 1867.*

IMPROVED LINIMENT.

*The Schedule referred to in these Letters Patent and making part of the same.*

TO ALL WHOM IT MAY CONCERN:

Be it known that I, JOB GIFFORD, of Smithport, in the county of McKean, and State of Pennsylvania, have invented a new and improved Liniment; and I do hereby declare that the following is a full, clear, and exact description thereof, which will enable others skilled in the art to make and use the same.

The present invention relates to an improved liniment for the relief and cure of inflammations, swellings, soreness of limbs, flesh wounds of all descriptions, chilblains, and for irritations of the flesh or skin, either for men or beasts, but more especially for the latter.

This liniment, which I term "Veterinary Liniment," is composed of spirits of camphor, saltpetre, alum, salt, and vinegar, or spirits of camphor, sal nitre, alum, salt, and vinegar, mixed together in the proportions following: one part spirits of camphor; two parts saltpetre; two parts alum; three parts salt; thirty-two parts vinegar; or, one ounce spirits of camphor; two ounces sal nitre; two ounces alum; three ounces salt; two pints vinegar. The several ingredients are mixed together and boiled for about one minute, when, being filtered, it is bottled and corked air-tight.

Having thus described my invention, I claim as new, and desire to secure by Letters Patent—

The liniment composed of the ingredients mixed together in or about the proportions described, for the purpose specified.

The above specification of my invention signed by me this 17th day of November, 1866.

JOB GIFFORD.

Witnesses:
    M. A. SPRAGUE,
    S. D. FREEMAN.